Jan. 1, 1957 H. W. SEIBEL 2,776,067
SEAL SEVERING DEVICE
Filed Aug. 23, 1954
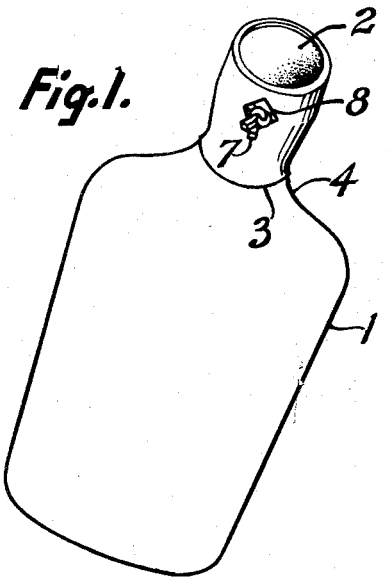
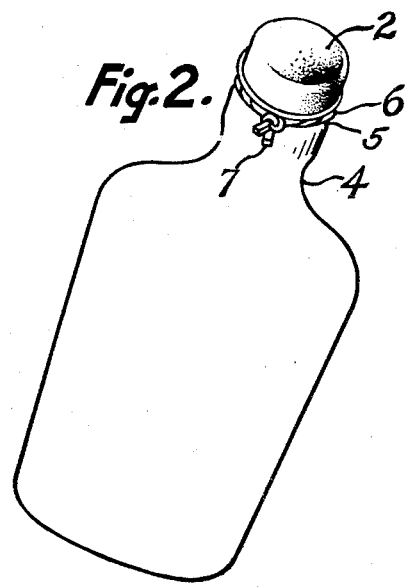
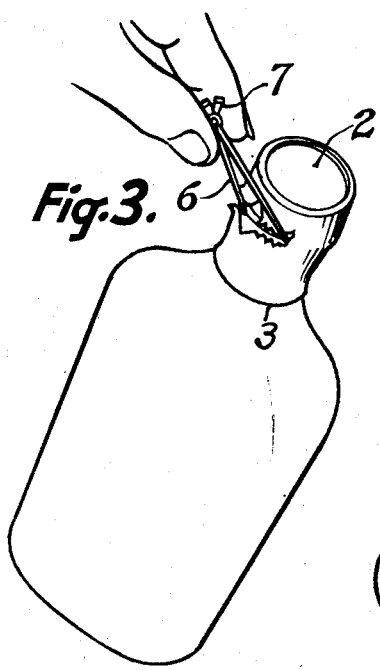
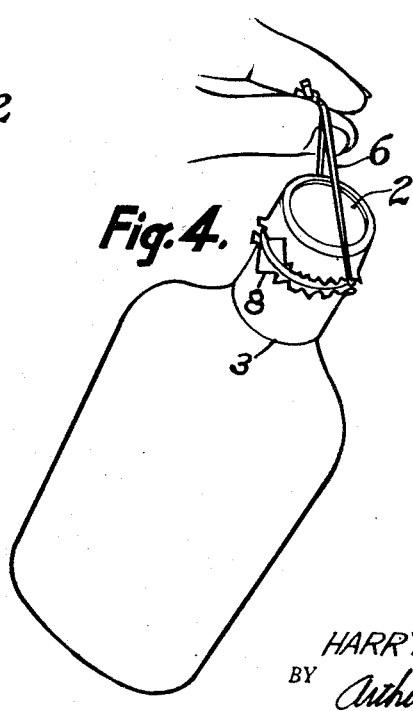
INVENTOR.
HARRY W. SEIBEL
BY *Arthur Robert*
Attorney

United States Patent Office 2,776,067
Patented Jan. 1, 1957

2,776,067

SEAL SEVERING DEVICE

Harry W. Seibel, Louisville, Ky.

Application August 23, 1954, Serial No. 451,418

3 Claims. (Cl. 215—46)

The present invention relates to an opener for the sealing sleeve of a bottle.

It is current practice to seal the closure member of a bottle or jar by a plastic sleeve which extends over the closure member and neck of the bottle, and prevents removal of the closure member without damage to the seal.

It has been proposed to employ an inscribed wire within the sealing sleeve of a bottle, so that the sleeve may be severed by rotating or withdrawing the wire. Such devices are not positive in action and are relatively expensive.

It is an object of the present invention to provide an effective severing device for the plastic sleeve which is inexpensive, positive in action, and is easy to operate.

The opener of the present invention comprises a thin band of rubber or other elastometric material circumscribing the bottle under the plastic sealing sleeve, and having a finger grip portion extending through a hole in the sleeve. This finger portion may be a knot or other thick portion on the band. To sever the seal the finger grip portion is first pulled outwardly to stretch the elastic band, then the band is pulled over the top of the bottle, and this causes the elastic band to cut the seal. When the band is thus pulled off the bottle the sleeve has been severed entirely around the bottle.

The invention will be described in greater detail in connection with the accompanying drawing illustrating a preferred embodiment of the invention by way of example, and wherein:

Figure 1 is a perspective view showing the invention applied to a bottle;

Figure 2 is a similar view of the invention without the plastic sleeve;

Figure 3 illustrates the first step in severing the seal; and

Figure 4 shows the next step in opening the seal.

Referring to the drawing, there is shown a bottle 1 having a screw cap 2 and a sealing sleeve 3 formed around the cap and neck 4 of the bottle. As shown in Figure 2, there is a groove or recess 5 formed between the flange on the bottle neck and the base of the cap 2, and a band 6 of rubber or other elastic material is located in this recess. The band may have a knot 7 which protrudes through an opening 8 in the band, this knot serving as a finger grip.

To sever the sealing sleeve 3 the finger grip 7 is grasped by the operator, pulled out, as shown in Figure 3, and drawn upward over the cap of the bottle, as shown in Figure 4. In so doing, the rubber band severs the plastic sleeve 3 at the hole 8 through which the hand grip extended, and this severing is continued around the sleeve as the band is drawn over the bottle cap, till the sleeve is completely severed and the rubber band is free of the bottle.

I claim as my invention:

1. In a seal severing device the combination comprising: a bottle; a closure cap for the bottle; a sleeve of plastic material overlapping the bottle and closure cap and having a small opening in said sleeve; and an elastic endless band around said bottle having a finger grip portion extending through said opening whereby, when the finger grip is pulled the elastic band is stretched and reduced in cross section to sever the plastic sleeve.

2. In a seal severing device as specified in claim 1 wherein said closure comprises a cap threaded onto the bottle, and said elastic band lies in a groove formed below the bottom edge of said cap.

3. A seal severing device as specified in claim 1 wherein said finger grip portion comprises a knot.

References Cited in the file of this patent

UNITED STATES PATENTS

| 2,198,117 | Kancer | Apr. 23, 1940 |
| 2,227,880 | Dodge | Jan. 7, 1941 |
| 2,432,132 | Allen | Dec. 9, 1947 |
| 2,584,336 | Eisenhardt | Feb. 5, 1952 |

FOREIGN PATENTS

| 281,893 | Italy | Jan. 27, 1931 |